United States Patent [19]

Young

[11] Patent Number: 5,634,682

[45] Date of Patent: Jun. 3, 1997

[54] SUNSHINE SHELTER APPARATUS FOR WINDOW AREA OF PASSENGER TRANSPORTATION

[76] Inventor: Hai T. Young, 10313 Lower Azusa Rd., Temple City, Calif. 91780

[21] Appl. No.: 554,526

[22] Filed: Nov. 7, 1995

[51] Int. Cl.⁶ .................................................. B60J 3/00
[52] U.S. Cl. .......................... 296/97.8; 296/97.4
[58] Field of Search .................. 296/97.1, 97.2, 296/97.3, 97.4, 97.8, 97.9, 97.12

[56] References Cited

U.S. PATENT DOCUMENTS

| 1,419,321 | 6/1922 | Smith | 296/97.3 |
| 1,557,388 | 10/1925 | Tilden | 296/97.4 |
| 3,333,886 | 8/1967 | Wenger | 296/97.12 |
| 3,412,506 | 11/1968 | Shiota | 296/97.4 X |
| 4,618,132 | 10/1986 | Kimura et al. | 296/97.4 X |
| 4,932,710 | 6/1990 | Chen | 296/97.8 X |
| 4,953,908 | 9/1990 | Dondlinger | 296/97.4 |

FOREIGN PATENT DOCUMENTS

| 635734 | 3/1962 | Italy | 296/97.4 |
| 180518 | 7/1988 | Japan | 296/97.4 |

Primary Examiner—Joseph D. Pape
Attorney, Agent, or Firm—David & Raymond; Raymond Y. Chan

[57] ABSTRACT

A sunshine shelter apparatus for window area of passenger transportation such as land vehicle, airplane or ship, includes a plurality of shelter assemblies mounted on the respective windows of the passenger transportation respectively. Each shelter assembly comprises a mounting device mounted on the framework of the respective window or windshield, a blind device having a plurality of slats mounting parallelly and rotatably on the mounting device, and an operating device equipped with the blind device for adjusting the disposing angle of each slat, extending the slats to cover the respective window area or gathering the slats. Whereby, the present invention can neither let the radiation of the sunshine attack the driver and the passengers nor hidden the field of vision of the passengers. The passengers can maintain their field of vision and shade the radiation of sunshine from reaching them by positioning the slats of the blind device horizontally.

1 Claim, 10 Drawing Sheets

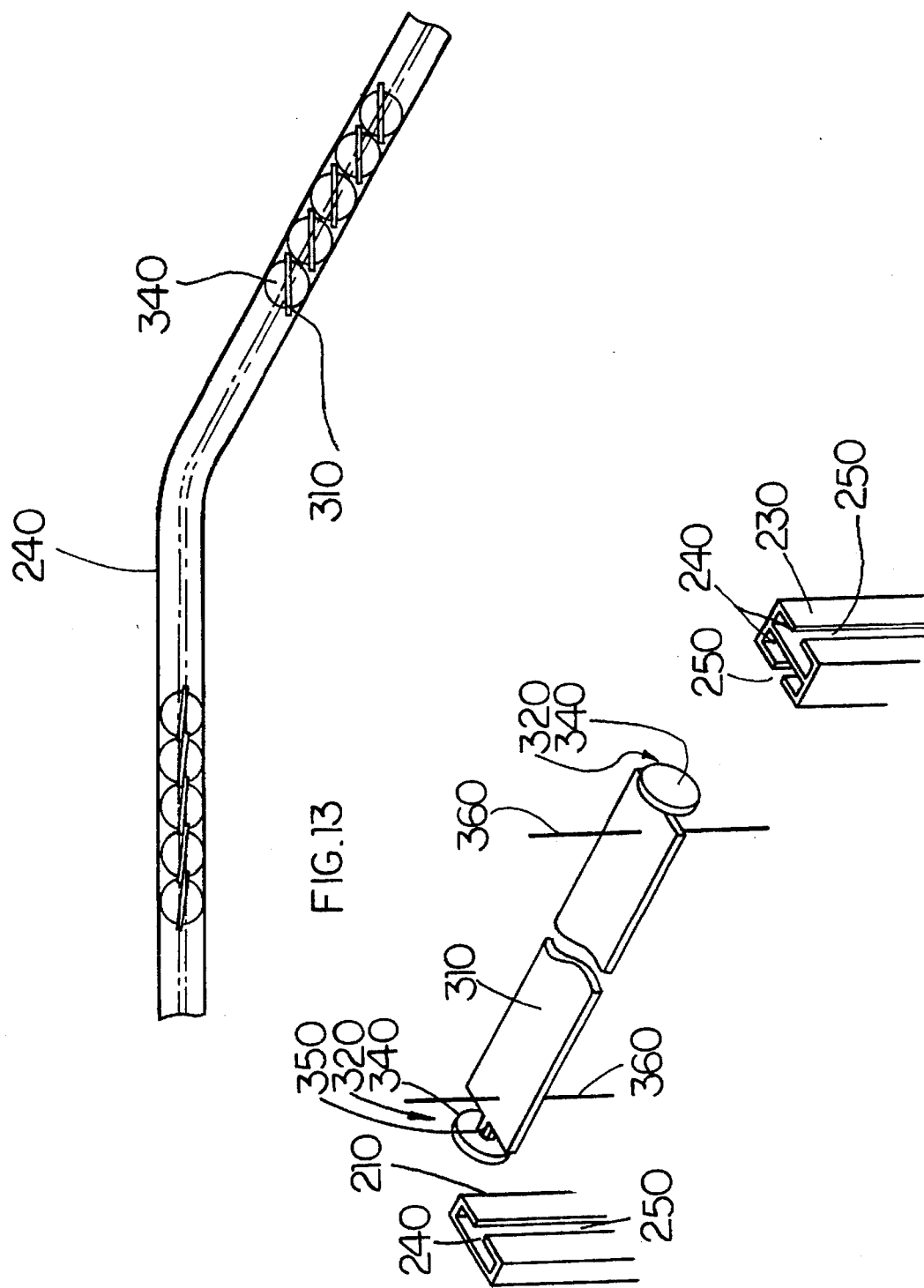

SUNSHINE SHELTER APPARATUS FOR WINDOW AREA OF PASSENGER TRANSPORTATION

BACKGROUND OF THE PRESENT INVENTION

The present invention relates to sunshine shelter, and more particularly to a sunshine shelter apparatus for window area of a passenger transportation such as vehicle, airplane, ship and ferry etc. The sunshine shelter apparatus of the present invention can prevent the radiation of sun shine from attacking the passengers without obstructing the passengers' field of vision.

It is well known that overmuch exposure under sunshine does no good to human health, for example it hurts human skin and eyes and even causes skin cancer. However, people the drivers or the passengers on other transportation such as trains, buses, ships, and airplanes are always inevitably disturbed or hurt by the radiation of sunshine. Most people complain about the radiation of sunshine because it does hurt to their skin and makes their skin aging and becoming rough and tanned with wrinkle.

Conventional method for reducing the shortcomings mentioned above is to tint all window glasses. However, it is illegal in most of the states in United States because the tinting may reduce the vision of the drivers and passengers, especially at night and cloudy weather. In mass transportation such as airplanes, ships, trains and buses, integral rigid curtains or cloth curtains are utilized to cover the entire window area for preventing the sunshine to disturb the passengers. But, in the meantime, the curtains would obstacle the whole field of vision of the passengers in the meantime.

When the vehicles are driven under sunshine, the strong sunshine may shine upon the drivers' faces and eyes that the drivers may be annoyed by those discomfort, uneasiness and inconvenience caused by the strong sunshine. It may affect the drivers' driving judgment and cause much hazard and unexpected danger during driving.

A pair of conventional shelter wings are mounted on an upper edge of a front windshield of a vehicle. The driver and the front passenger can swing the shelter wings toward the front windshield for shading the upper portion of the windshield to prevent the sunshine from shining directly upon the driver's and the front passenger's eyes. However, the shelter wings also obstacle portion of the windshield that reduces the field of vision of the driver that lessens the driving safety. Moreover, when the driver change the car's direction, he or she has to use one hand to re-adjust the position of the shelter wing from the front windshield to the side window. It may divert the driver's attention and cause accident. Besides, the faces, hands and the bodies of the driver and the front passenger are still exposed to the sunshine from most directions. The defectives caused by the sunshine to human skin are unavoidable.

Most drivers have such experience that when the vehicles park outdoor under the sunshine, the sun radiation may directly shine on the vehicles. The heat is conducted to the vehicles' interiors that may raise the interior temperature. The airtight interior of the vehicle will become hot and stuffy for re-entrance. Especially the steering wheel will be heated to become hand burning. The driver has to open the doors to enable air circulating for a while until the interior temperature decreases, and then starts the engine to run the air condition before the driver and the passengers get in the vehicle. It wastes much of time, so that to some impatient people, they may rush in the vehicle and drive. The extremely hot interior may affect the driving attention of the driver and the burning steering wheel is difficult to operate that may cause unexpected accident.

Two common devices are used currently to solve the aforesaid problems, which are a cardboard shelter and a twisted shelter for covering the entire front windshield of a vehicle. The cardboard shelter is made of hard cardboard paper and is foldable. The twisted shelter is made of nylon cloth with two circular springs mounted therein and is also foldable by twisting. Such conventional shelters are very troublesome that the driver has to unfold and extend it to cover the entire front windshield while parking. Before driving, the driver also has to refold and remove it from the front windshield. The folding and unfolding, as well as the installing and removing, operations are too troublesome and require much time since the interior space of a vehicle is too narrow for operating a shelter as large as the windshield. Moreover, we need to reserve some room for storing up the conventional extensible shelter when it is not used. The most essential shortcoming of such conventional extensible shelters is that since the space between the front windshield and the steering wheel and the back sight mirror is so narrow, every time when they are unfolded to cover or removed form the windshield, the back sight mirror may be bumped to move away from its original position. The driver has to reset the position of the back sight mirror before driving every time.

SUMMARY OF THE PRESENT INVENTION

The main object of the present invention is to provide a sunshine shelter apparatus for window area of passenger transportation which can shade the sunshine from shining upon the faces and hands of passengers without obstructing the vision of passengers.

Another object of the present invention is to provide a sunshine shelter apparatus for window area of passenger transportation that the shading angle thereof can be adjusted according to the direction and angle of the sunshine.

Another object of the present invention is to provide a sunshine shelter apparatus for window area of passenger transportation which can be adjusted to shelter all window area from sunshine while parking or desired by the passengers.

Another object of the present invention is to provide a sunshine shelter apparatus for window area of passenger transportation which can be easily operated to enable the window area entirely unsheltered.

Another object of the present invention is to provide a sunshine shelter apparatus for window area of passenger transportation which is easy to operate and install.

Accordingly, the present invention provides a sunshine shelter apparatus for window area of passenger transportation such as a car. The car generally has a front windshield, a back windshield and a plurality of side windows. The sunshine shelter apparatus comprises a pair of shelter assemblies mounted on the front windshield of the car. Each shelter assembly comprises a mounting device mounted on a periphery framework of the front windshield, a blind device having a plurality of slats mounting parallelly and rotatably on the mounting device, and an operating device equipped with the blind device for adjusting the disposing angle of each slat. Whereby, the present invention can prevent the radiation of the sunshine from attacking people without obstructing the field of vision of the passengers. In other words, by positioning the slats of the blind device horizontally can shade the radiation of sunshine from reaching them. During parking, the driver can merely rotate all the slats to lie flat in order to entirely shade the window area from sunshine.

BRIEF DESCRIPTION OF THE DRAWINGS

FIG. 12 is a partial exploded perspective view of the shelter assembly according to the above second preferred embodiment of the present invention.

FIG. 13 is a partial schematic view showing the sliding relation between a rail and the blind device according to the above second preferred embodiment of the present invention.

DETAILED DESCRIPTION OF THE PREFERRED EMBODIMENT

Please referring to FIGS. 1 to 5, a sunshine shelter apparatus for window area of a passenger transportation according to a preferred embodiment of the present invention is illustrated. The passenger transportation, such as a car, generally has a front windshield, a back windshield and a plurality of side windows. the sunshine shelter apparatus comprises a pair of shelter assemblies 1 mounted on the front windshield of the car.

Figure 1:
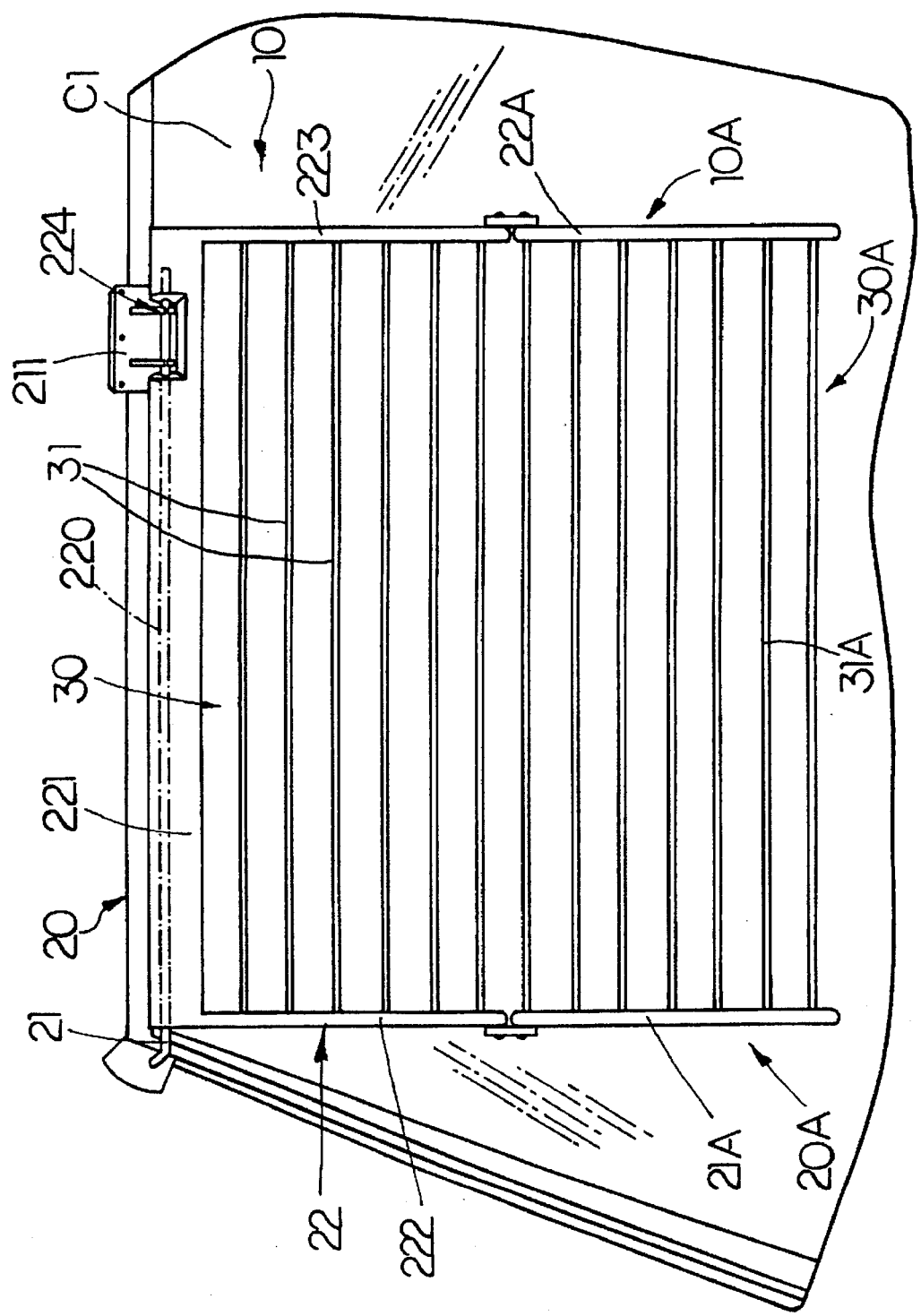
FIG. 1 is a front view of a windshield shelter assembly of a first preferred embodiment according to the present invention.

As shown in FIG. 1, two identical windshield shelter assemblies 10 are mounted on the right and left portions of the front windshield C1 of a car. Each windshield shelter assembly 10 comprises a mounting device 20 and a blind device 30 which has a plurality of slats 31 rotatably and parallelly mounted on the mounting device 20.

The mounting device 20 comprises a mounting rod 21 and a wing frame 22 mounted on the mounting rod 21. A connecting end of the mounting rod 21 is rotatably mounted to one of the top corner, the right corner or the left corner, of the front windshield C1 in the usual manner as that of the conventional shelter wing mounted on the upper portion of the front windshield C1. The mounting rod 21, as shown in FIG. 1, is extended to the medial upper portion of the front windshield C1 where a clip-fit catch 211, as the well known manner, is affixed for holding the mounting rod 21 in horizontal position. The wing frame 22 includes a horizontal top member 221 having a longitudinal casing hole 220 which is rotatably casing with the mounting rod 21 so as to mount the wing frame 22 in position. Two side members 222, 223 are extended from the two ends of the top member 221 for spacedly mounting the slats 31 of the blind device 30 in parallel position. A recess 224 is provided near the free end of the top member 221 so that a portion of the mounting rod 21 is exposed there for connecting with the clip-fit catch 211. An inner side of each side member 222, 223 has a plurality of holding holes 225 and stoppers 226 which are protruded adjacent to the holding holes 225 respectively.

Figure 2:
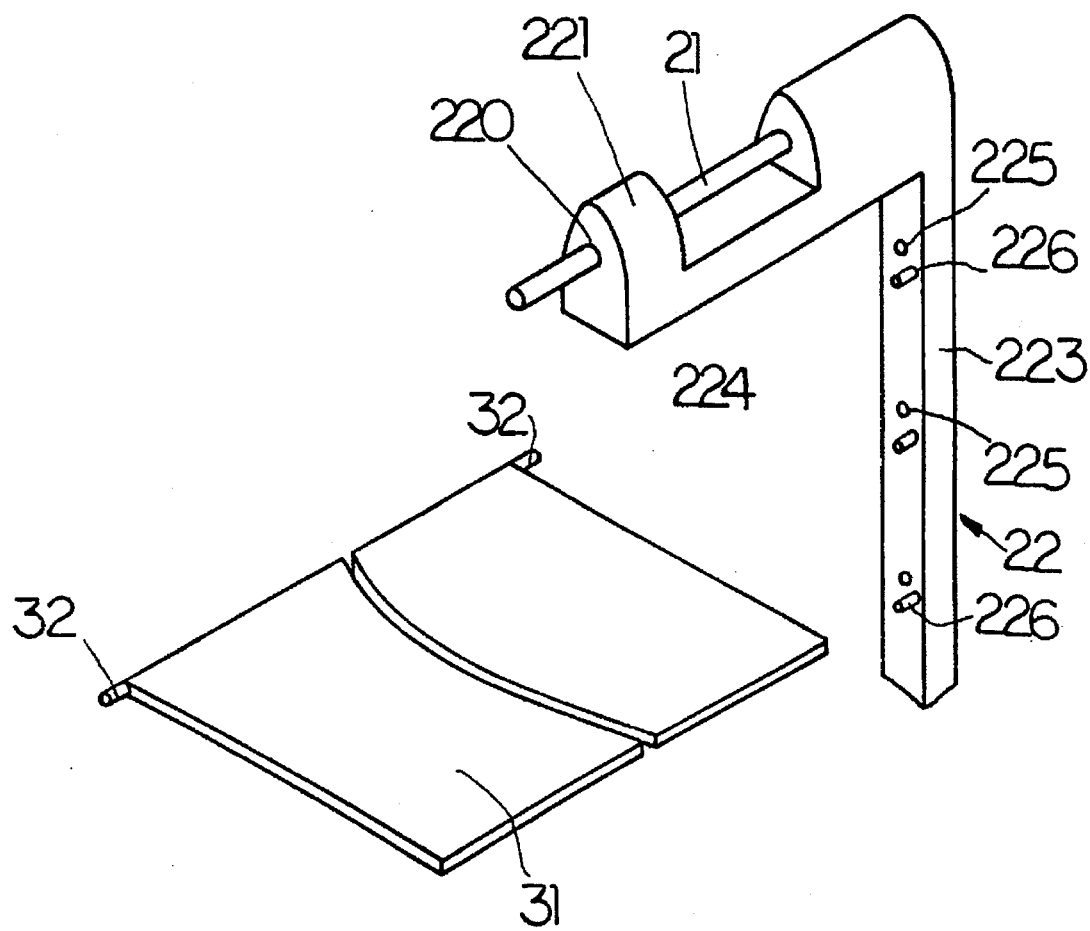
FIG. 2 is a partial exploded perspective view of the windshield shelter assembly of the above first preferred embodiment according to the present invention.
Figure 3:
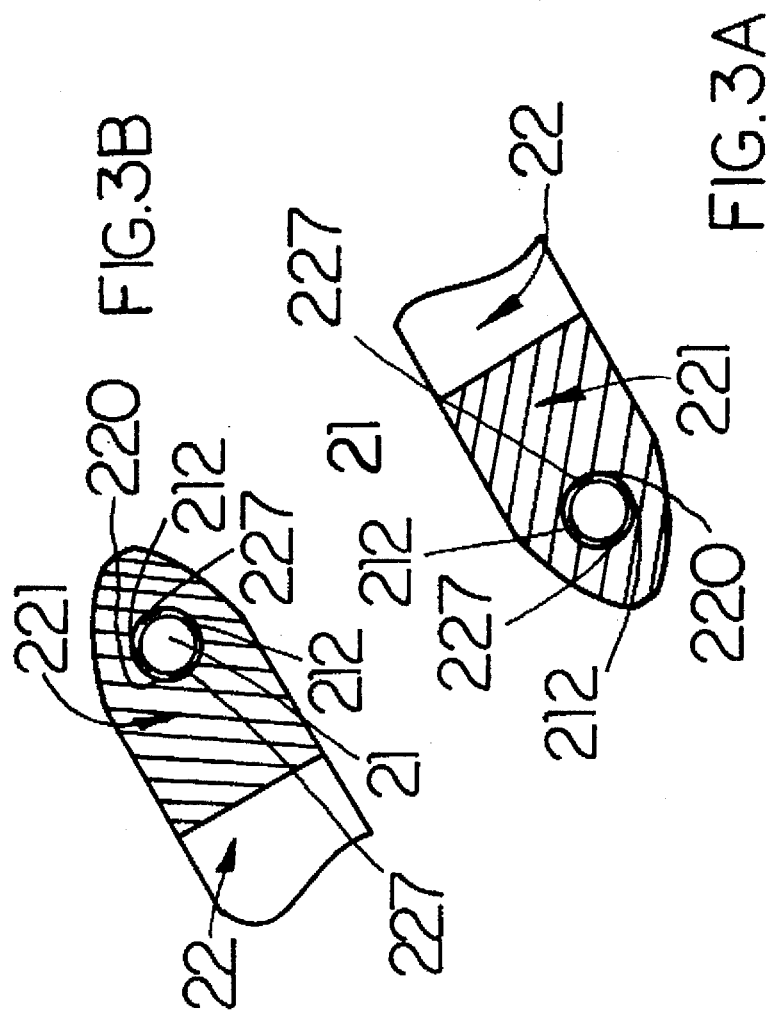
FIGS. 3A and 3B are partial sectional view of the windshield shelter assembly of the above first preferred embodiment according to the present invention, showing the frictional configuration between the mounting rod and the top member.

The slats 31 of the blind device 30 are thin blades made of rigid material, such as plastic or wooden blades, as shown in FIG. 2. One side of each slat is extended from two ends thereof to protrude two end pivots 32 respectively. Each slat 31 is mounted to the mounting device 22 by pivotally and rotatably inserting the two end pivots 32 thereof into two of the holding holes 225 provided on the two side members 222 and 223 respectively for spacedly and parallelly holding in position. Therefore, when the slats are swinging downward, the bottom sides of the slats 31 are stopped and supported by abutting to the stoppers 226 respectively.

Figure 4:
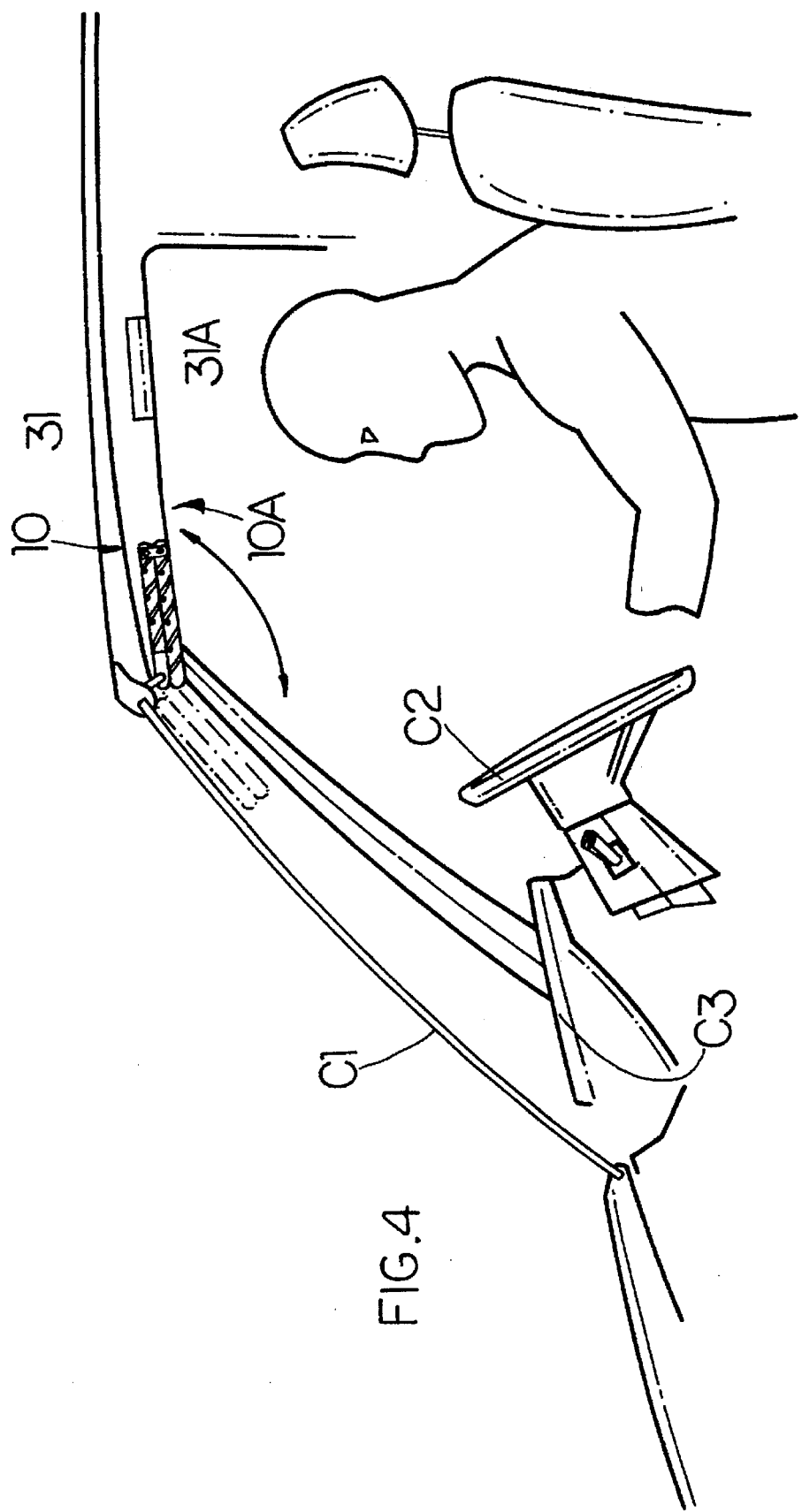
FIG. 4 is a perspective view of the windshield shelter assembly, in an upper overlapped position, of the above first preferred embodiment according to the present invention.

As shown in FIGS. 3A, 3B and 4, both the top member 221 and the mounting rod 21 provide a frictional configuration, in which two opposing sections of arcuate jutting teeth 212 are protruded on an outer circumference of the mounting rod 21 and two opposing sections of arcuate protruding teeth 227 are protruded on an inner circumference of the casing hole 220 of the horizontal top member 221. The jutting teeth 212 of the mounting rod 21 and the protruding teeth 227 of the casing hole 220 will be engaged with each other when the top member 221 is trend to rotate, so that the engagement of the jutting teeth 212 and the protruding teeth 221 would prevent the top member 221 to self-rotate due to the gravity. If a rotation force is applied to the top member 221 to overcome the friction between the jutting teeth 212 of the mounting rod 21 and the protruding teeth 227 of the top member 221, the blind device 30 can be swung downwards. As shown in FIG. 4, the windshield shelter assembly 10 is normally swung up to abut upon the ceiling of the car when it is not used. In the meantime, the four sections of the jutting teeth 212 and protruding teeth 227 are staggered and thus provides a locking effect to the mounting device 20 for holding the blind device 30 in position. When the driver or passenger of the car applied a certain force to swing the mounting device 20 and the blind device 30 downward to overcome the friction between the jutting teeth 212 and the protruding teeth 227, the mounting device 20 is rotated downwardly until the teeth 212 and 227 are staggered again. At that moment, the mounting device 20 and the blind device 30 are swung to and locked in a lower shading position abutting to the windshield, as the broken lines shown in FIG. 4.

Figure 5:
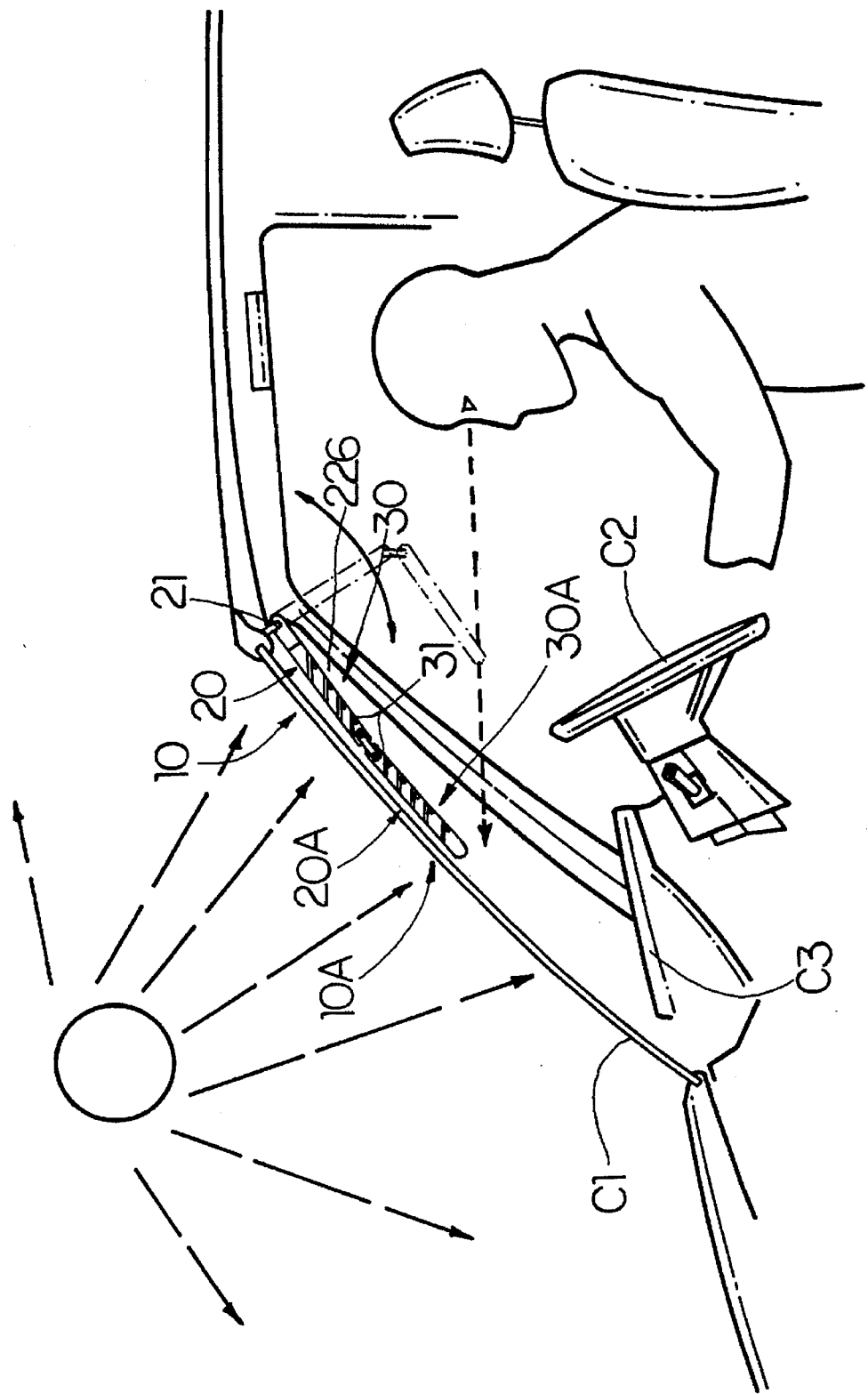
FIG. 5 is a perspective view of the windshield shelter assembly, in a lower extended shading position, of the above first preferred embodiment according to the present invention.

As shown in FIG. 5, when the mounting device 20 and the blind device 30 are swung down to its lower shading position, all the slats 31 will swing down due to gravity until they are stopped and supported by the stoppers 226 respectively. In that lower position, the slats 31 are positioned horizontally and parallelly that the surrounding in front of the windshield is visible to the driver through the intervals between those thin slats 31. In the meanwhile, portion of the sunshine is shaded by the slats from shining upon the driver's or the front passenger's face.

As shown in FIG. 4, when the mounting device 20 and the blind device 30 are swung up to its upper position, the slats 31 will rotate forward to overlap with each other so as to provide as much room as possible above the driver's or the front passenger's head.

In order to provide more shading area to the windshield, an additional second windshield shelter unit 10a is connected to the first windshield shelter assembly 10 as disclosed above, as shown in FIGS. 1, 4 and 5. The second windshield shelter unit 10a comprises a second mounting device 20a which has two side pieces 21a, 22a pivotally connected to the two free ends of the two side members 222, 223 of the first windshield shelter assembly 10, and a second blind device 30a which includes a plurality of slats 31a mounted horizontally and spacedly between the two side pieces 21a, 22a in the same mounting manner as the slats 31 mounted on the first mounting device 20. The pivotal connection between the two side pieces 21a, 22a and the two side members 222, 223 also utilizes the frictional configuration, as shown in FIGS. 3A and 3B, between the top member 221 and the mounting rod 21, so as to enable the second windshield shelter unit 10a to swing between a lower position abutting to the windshield, as shown in FIG. 4, and an upper position overlapping with the first windshield shelter assembly 10, as shown in FIG. 5. With the installment of the second windshield shelter unit 10a, the shading area of the windshield C1 is increased so that even the steering wheel C2 can be shaded from sunshine by the second windshield shelter unit 10a, Accordingly, the face and the hands of the driver can both be shaded from the radiation of sunshine.

It is worth to mention that the unshaded lower portion of the windshield C1 can merely permit the sunshine directing to the instrument panel C3 of the car, as shown in FIG. 5. When the sun is located horizontally to the car, during sunrise or sunset, the faint and gentle sunshine is harmless to the driver or passengers. Furthermore, the aforesaid windshield shelter assembly 10 and unit 10a can also apply to the back windshield for shading the sunshine from the back of the car.

To the side window C4 of the car, as shown in FIGS. 6 to 9, a window shelter assembly 10' is installed. The window shelter assembly 10' comprises a mounting device 20' and a blind device 30'. The mounting device 20' includes a case 21' and a hanging unit 22' which is a S-shaped hanger with one thin upper U-shaped end firmly hanged on the top edge of the side window C4 and the other lower U-shaped end extended on the inner side of the side window C4. The case 21' is horizontally hanged and affixed to the inner side of the car door C5. The blind device 30' comprises a plurality of slats 31' which are made of thin plastic or wooden material and connected spacedly and parallelly by means of transparent thread, such as the fishing thread, in the usual manner. The blind device 30' further comprises a rigid top frame 32' and a U-shaped slat hanger 33' which is connected on the top frame 32' for hooking with the lower U-shaped end of the hanging unit 22' when the blind device 30' is extended to cover the window C4.

Figures 6, 7:
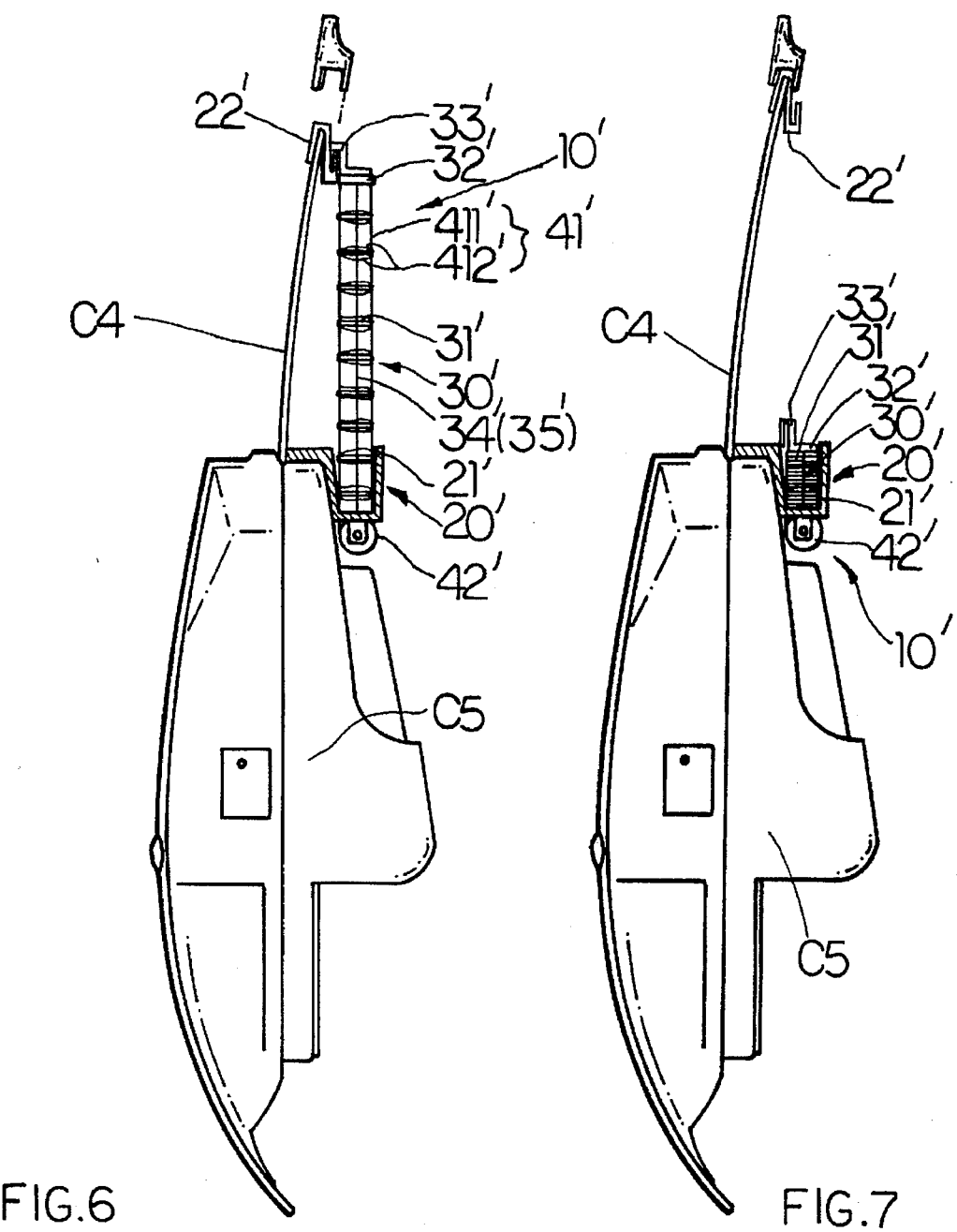
FIG. 6 is an end view of a car door with side window of the above first preferred embodiment according to the present invention, wherein a window shelter assembly is installed and its blind device is in an extended shading position.
FIG. 7 is an end view of a car door with side window of the above first preferred embodiment according to the present invention, wherein on which the window shelter assembly is installed and the blind device is in a gathering position.
Figure 8:
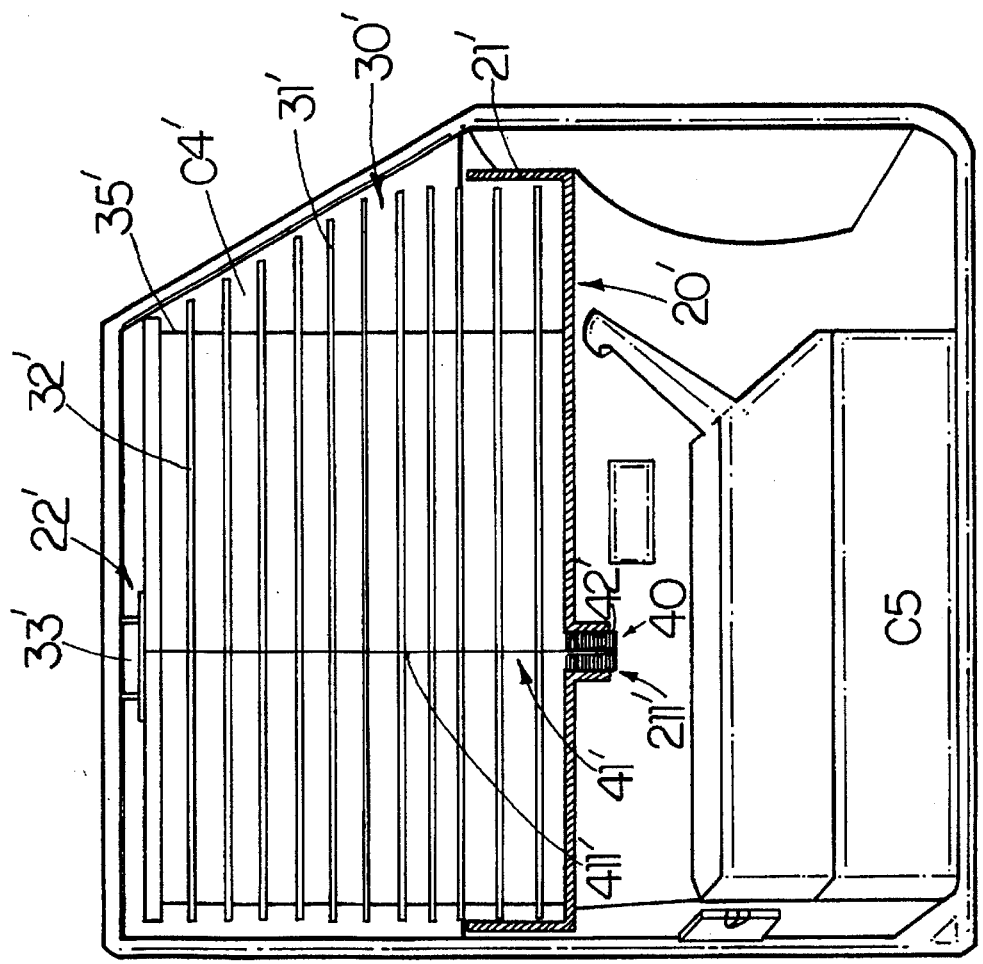
FIG. 8 is a front view of a car door with side window of the above first preferred embodiment according to the present invention, wherein the window shelter assembly is installed and its blind device is in an extended shading position.

Since the side window C4 has an slant side, as shown in FIG. 8, the slats 31' have different length wherein the uppermost and the bottom slats 31' have the shortest and the longest length respectively while the other intermediate slats 31' increase their length one by one. The length of the case 21' is slightly longer than the longest bottom slat 31' so that all the slats 31' can be collected within the case 21' while they are gathering together, as shown in FIG. 7. Two linking threads 34', 35' spacedly link the slats 31' together in parallel manner by penetrating a central portion of each slat.

Figure 9:
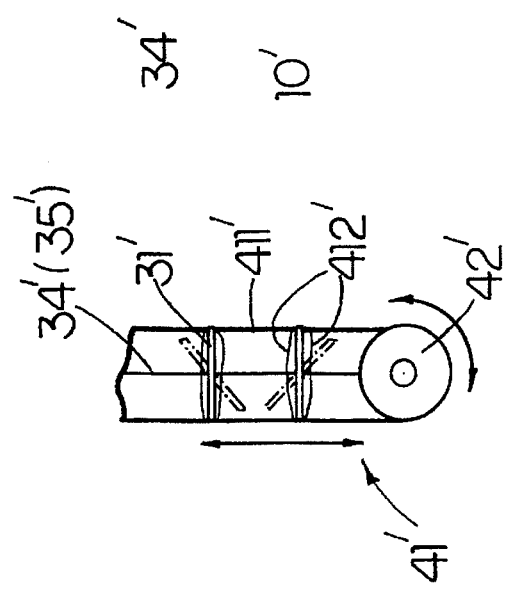
FIG. 9 is a partial sectional view illustrating the operating device of the window shelter assembly of the above first embodiment according to the present invention.

An operating device 40' is equipped with the blind device 30 for adjusting the angle of the slats 31' simultaneously, which comprises an operating thread unit 41' and an operating button 42'. The operating thread unit 41' includes an endless transparent thread 411' positioned between the two linking threads 34' and 35' for encircling all the slats 31' and a plurality of transverse threads 412' connected between the two sides of the endless thread 411' and positioned aboveneath and underneath of each slat 31', as shown in FIGS. 6 and 9. The operating button 42' is a round gear positioned at the bottom of the case 21', in which the lower portion of the operating button 42' is exposed through a bottom opening 211' provided at the respective position of the case 21' for operation. The bottom side of the endless thread 411' is affixed to the operating button 42', as shown in FIG. 9, and the top side of the endless thread 411' encircles the top frame 32'. Thus, when the driver or passenger rotates the operating button 42', by altering the angle of each slat 31' simultaneously, the slats 31' can be adjusted to be positioned horizontally to enable vision, inclined outwardly, inclined inwardly, or positioned vertically to entirely cover the window C4.

Figure 10:
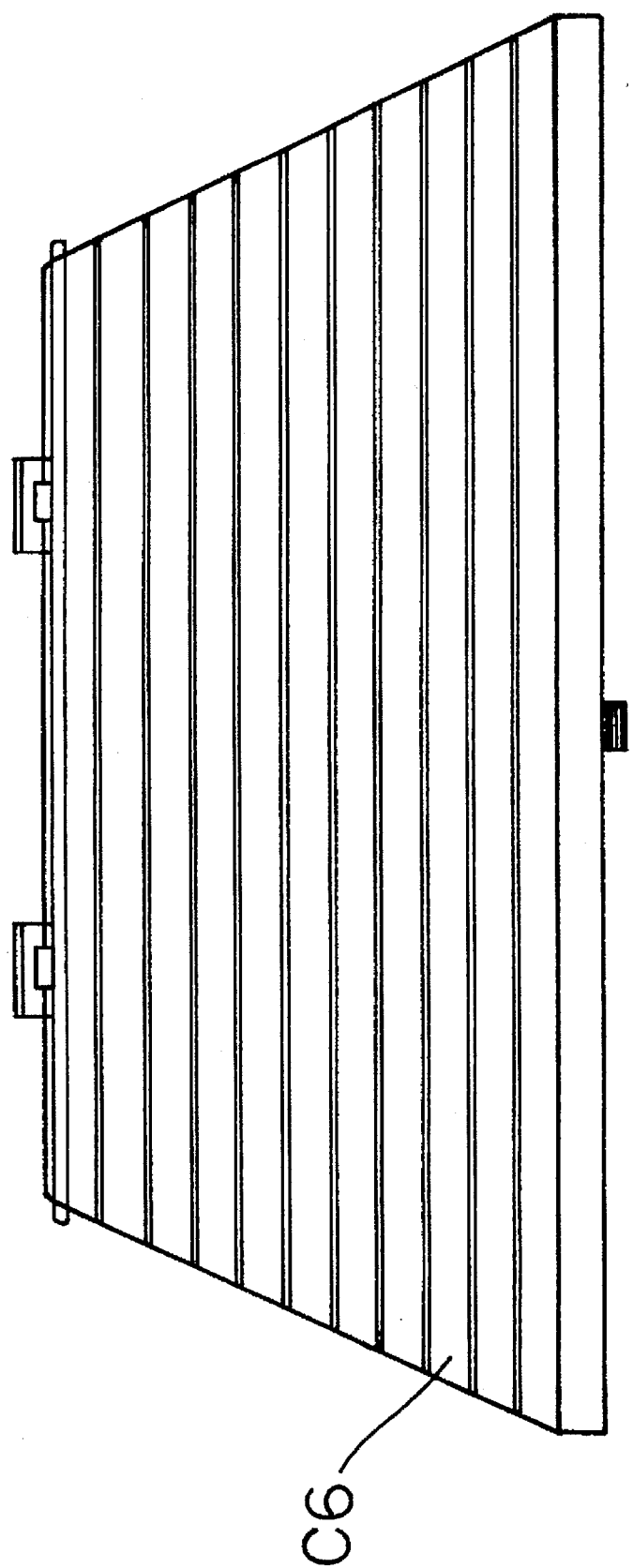
FIG. 10 is a front view of a back windshield with a window shelter assembly installed thereon according to the above first preferred embodiment of the present invention.

With the installation of the window shelter assembly 10' to the side window C4, one can lift the blind device 30' up and hang the slat hanger 33' to the hanger unit 22' so as to extend the blind device 30' for sunshine shading. Moreover, when the window C4 moves down, the blind device 30' will move down simultaneously to enable air circulation, as shown in FIG. 6. It is worth to mention that the window shelter assembly 10' according to the present invention can be built-in the car construction, such as the car doors, and also be installed to the back windshield C6, as illustrated in FIG. 10.

Figure 11:
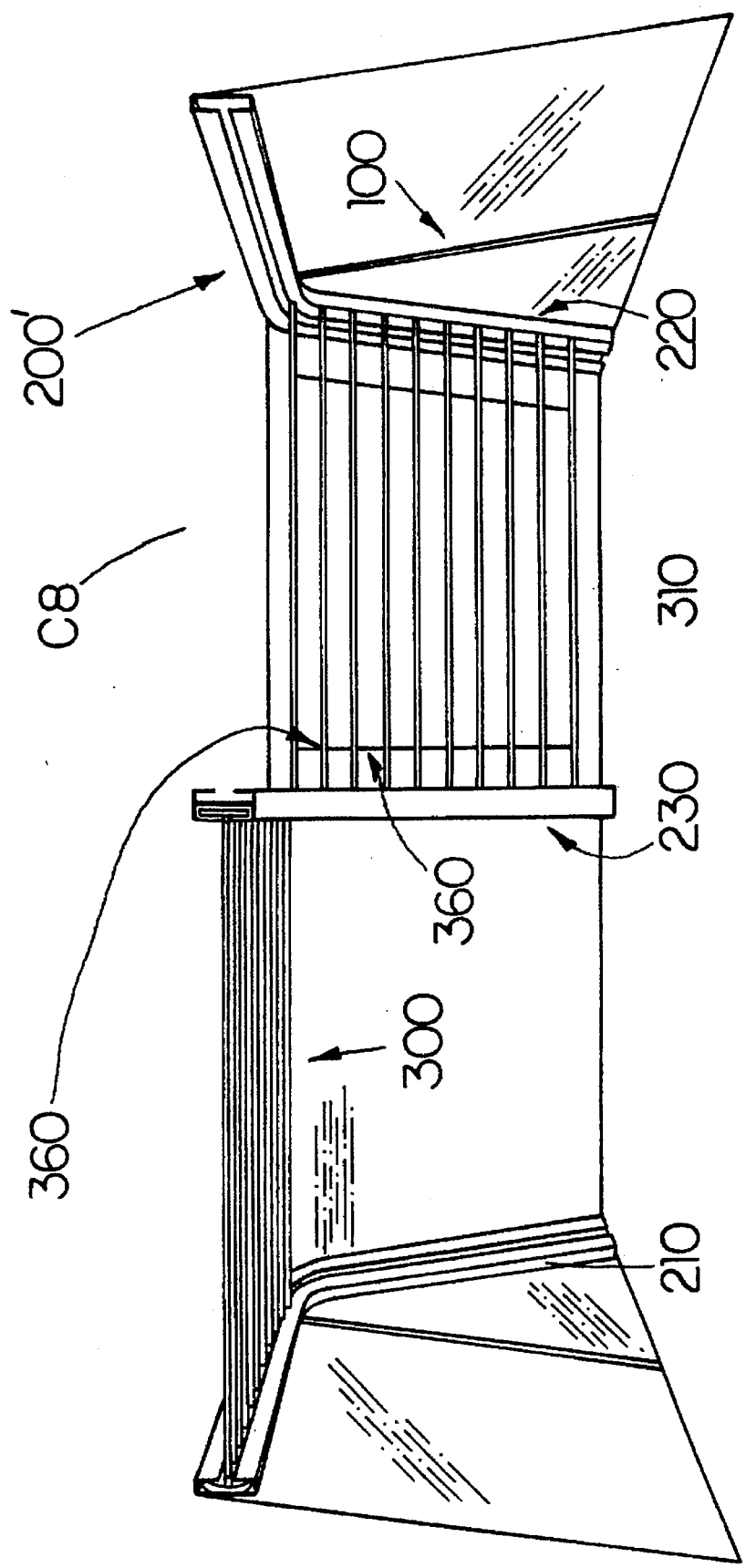
FIG. 11 is a perspective front view of a shelter assembly of a second preferred embodiment according to the present invention.

Please referring to FIGS. 11 to 13, a windshield shelter assembly 100 according to a second preferred embodiment is illustrated, which can be installed to the front or back windshield and comprises a mounting device 200 and a blind device 300. The mounting device 200 includes a plurality of rails 210, 220, 230 made of resilient material, which are installed to the two sides and a central portion of the windshield C7 and extended upward to the ceiling C8 of a car. Each side rail 210, 220 has an interior sliding chamber 240 and an inner side slot 250 extended along the length of the rail. The central rail 230 has two interior sliding chambers 240 and two side slots 250 located on the its sides respectively. The blind device 300 comprises a plurality of slats 310 spacedly and parallelly mounted between the two side rails 210, 220 and the central rail 230 in order to form a right and a left section. The right and the left sections can be operated separately. The two ends of each slat 310 connect with two sliding units 320 respectively. Each sliding unit 320 includes a circular sliding block 340 and a polygonal neck 350 connected between the sliding block 340 and the respective end of the slat 310. Four linking threads 360 are connected to the sides of the slats 310 respectively for spacedly linking together.

The slats 310 are mounted to the mounting device 200 by casing the outer sliding blocks 340 in the interior sliding chambers 240 of the side rails 210, 220 and the central rail 230 respectively. The polygonal necks 350 have a size slightly smaller than the slots 250 and are positioned along the slots 250 respectively for guiding the slats 310 to prevent self-rotation. Please referring to FIG. 13, the slats 310 are mounted horizontally between the rails 210, 220, 230, in which the sliding blocks 340 are in touch with each other for maintaining the interval between the slats, and are casing in the sliding chambers 240 for enabling easy sliding along the rails. When the blind device 300 is pushed upward to slide to the ceiling C8 position, the horizontally arrayed slats 310 can reduce the thickness of the blind device 300 so as to provide as much room as possible above the driver's or passengers' head. If the driver or the passenger would like to alter the angles of the slats 310, he or she merely needs to apply a turning force to rotate the slats 310. The necks 350 can be forced to turn an angle so as to enable the slats 310 to be inclined outwardly or inwardly or positioned vertically to cover the windshield while parking.

The present invention shall neither let the radiation of the sunshine attack people nor hidden the field of vision of the passengers that the conventional curtain configuration and tinting glasses did. When the shelter assembly applies to substitute the curtain configurations of land, sea and air transportation window area, the passengers can maintain their field of vision, in the meantime, and shade the radiation of sunshine from reaching them by positioning the slats of the blind device horizontally. If the passengers want to sleep or to shut off all kinds of outdoor lighting, they can merely rotate all the slats to lie flat in order to entirely cover the window area, so that neither sunshine nor any other light can leak in to disturb the passengers. The present invention is specially good for long journey night buses and night trains.

With the installation of the sunshine shelter apparatus according to the present invention to a passenger transportation, its most window area is shaded as integral curtains to stop intrusion of sun radiation on all window area, and thus the present invention not only does help to human's health but also consumes less energy on air condition. Besides, the interior of a vehicle can be shaded to prevent direct sun heating that the vehicle may maintain a lower interior temperature under sunshine.

I claim:

1. A sunshine shelter apparatus for a front windshield of a passenger transportation, comprising a pair of identical shelter assemblies, each shelter assembly comprising a first windshield shelter assembly and a second windshield shelter unit;

said pair of windshield shelter assemblies being mounted on a right and a left portion of said front windshield, each windshield shelter assembly comprising a mounting device and a blind device which has a plurality of slats rotatably and parallelly mounted on said mounting device;

each said mounting device comprising a mounting rod and a wing frame mounted on said mounted rod, two connecting ends of said mounting rods being rotatably mounted on a top right corner and a top left corner of said front windshield respectively, two free ends of said mounting rods being extended to a medial upper portion of said front windshield where two clip-fit catches are affixed thereon for holding said two mounting rods in horizontal position respectively, each said wing frame including a horizontal top member which has a longitudinal casing hole for rotatably casing with each said mounting rod so as to mounted said wing frame in position;

an outer circumference of each said mounting rod protruding two opposing sections of arcuate jutting teeth, an inner circumference of said casing hole of each said top member protruding two opposing sections of arcuate protruding teeth, in which said jutting teeth of said mounting rod and said protruding teeth of said casing hole being engaged with each other when said top member is rotated, thereby preventing said top member to self-rotate due to gravity, so that when a force is applied to said top member to overcome a friction formed between said jutting teeth of said mounting rod and said protruding teeth of said top member, said blind device is swung downwards;

each said mounting device further comprising two side members extended from said connecting end and said free end of said top member for spacedly mounting said slats of said blind device in parallel position, each said top member having a recess near said free end of said top member for exposing a portion of said mounting rod for connecting with said respective clip-fit catch;

said two second windshield shelter units connecting to said two first windshield shelter assemblies respectively, each said second windshield shelter unit comprising a second mounting device and a second blind device, in which said second mounting device has two side pieces pivotally connected to two free ends of said two side members of said respective first windshield shelter assembly, each said second blind device includes a plurality of slats mounted horizontally and spacedly between said two side pieces, an inner side of each said side member of said mounting device and each said side piece of said second mounting device having a plurality of holding holes and stoppers, said stoppers being protruded adjacent to said holding holes respectively, each said slat of said first windshield shelter assemblies and said second windshield shelter units having two end pivots extending from two ends of one side of said slat;

said slats of said first windshield shelter assemblies being mounted to said mounting devices by pivotally and rotatably inserting said two end pivots of each said slat into said holding holes provided on said two side members and respectively for spacedly and parallelly holding said slat in position, wherein said stoppers being just positioned underneath said slats respectively, therefore when each said slat swings downward, a bottom side of each said slat is stopped and supported by abutting to said respective stopper; and said slats of said second windshield shelter units being mounted to said respective second mounting device by pivotally and rotatably inserting said two end pivots of each said slat into said holding holes provided on said two side pieces respectively for spacedly and parallelly holding said slat in position, wherein said stoppers being just positioned underneath said slats respectively, therefore when each said slat swings downward, a bottom side of each said slat is stopped and supported by abutting to said respective stopper.

* * * * *